April 17, 1934.　　　S. D. MITEREFF　　　1,955,680
AUTOMATIC ELECTRIC REGULATOR
Filed Nov. 10, 1931　　　4 Sheets-Sheet 1
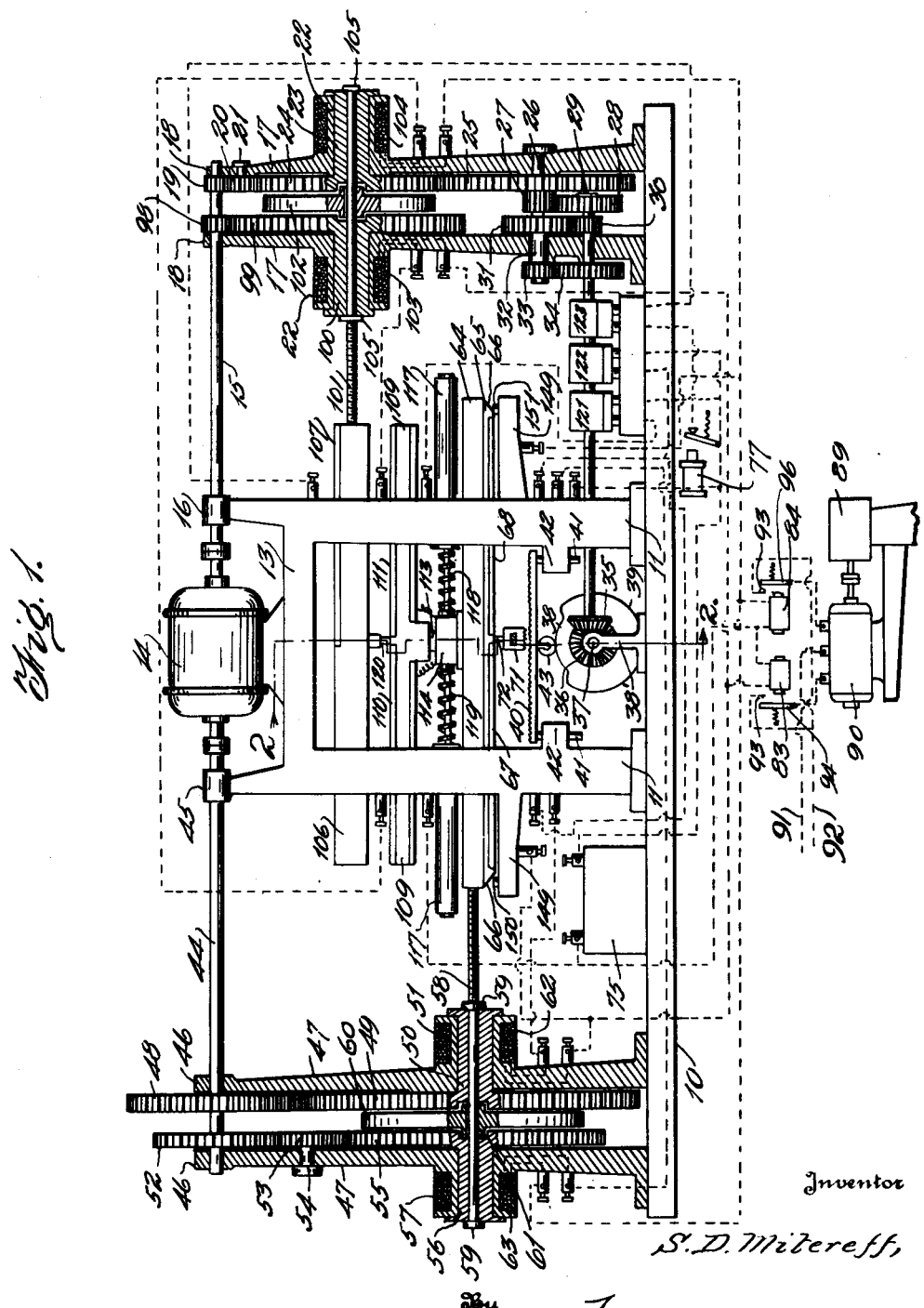

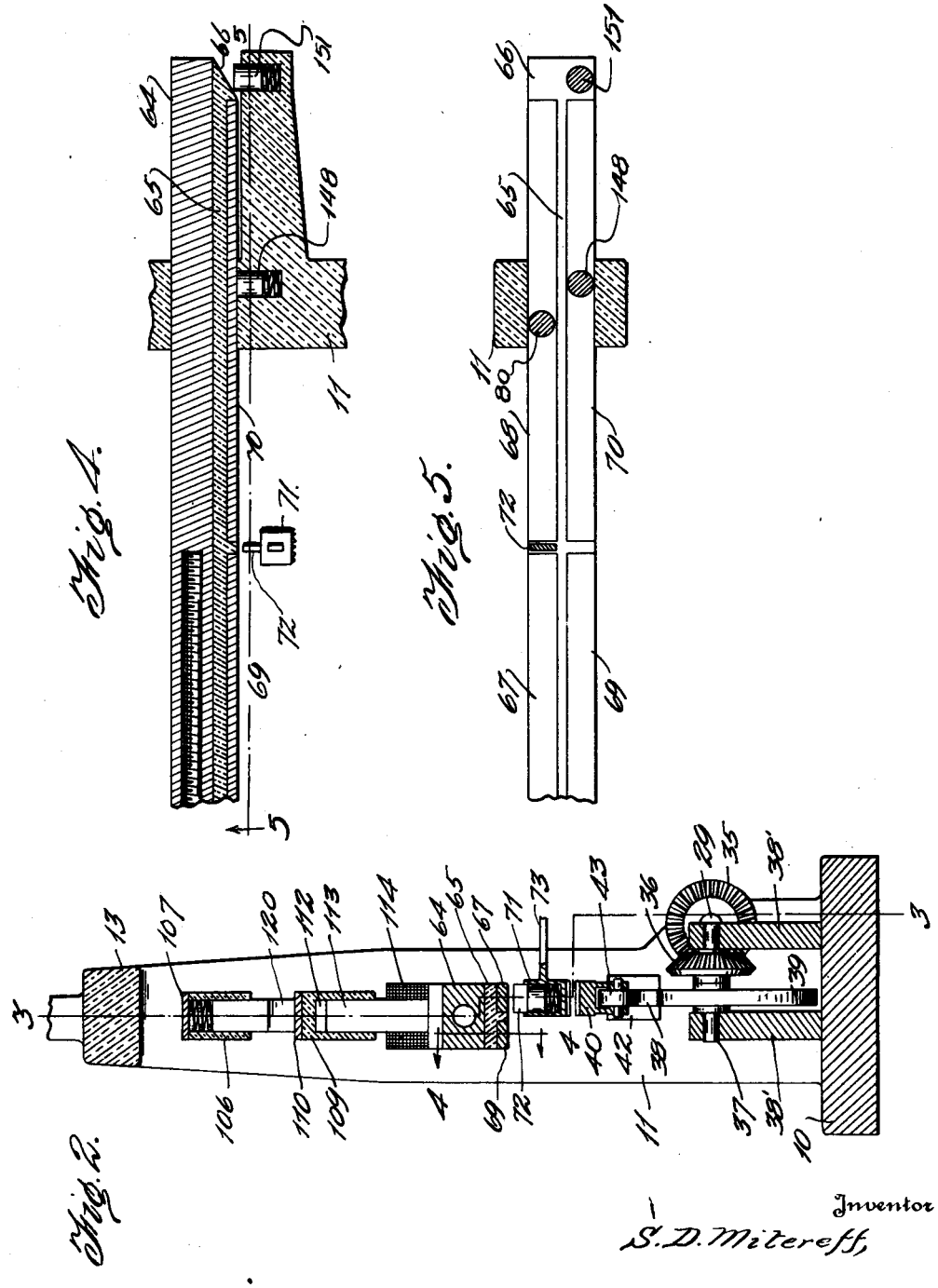

April 17, 1934.  S. D. MITEREFF  1,955,680
AUTOMATIC ELECTRIC REGULATOR
Filed Nov. 10, 1931  4 Sheets-Sheet 3
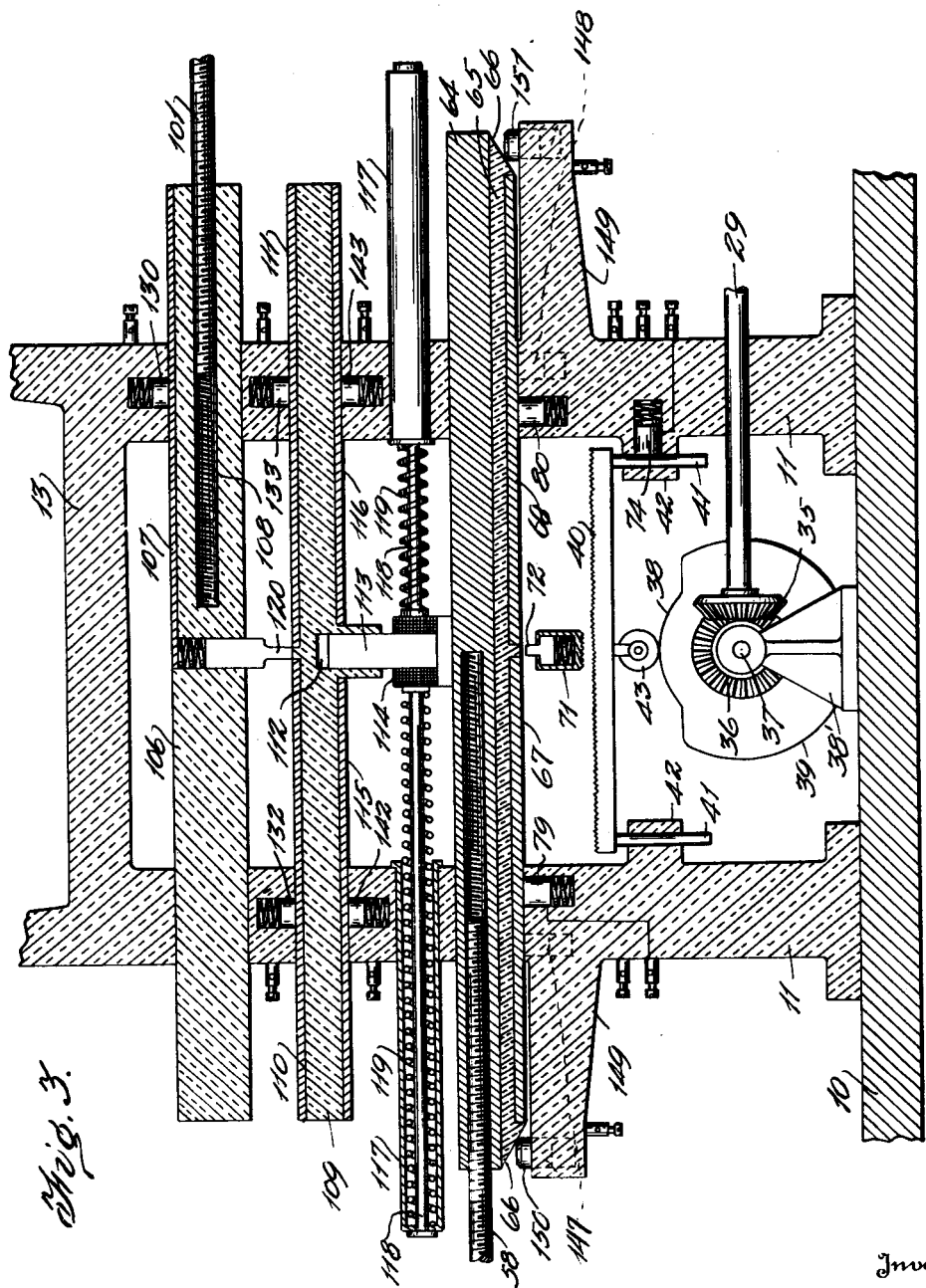

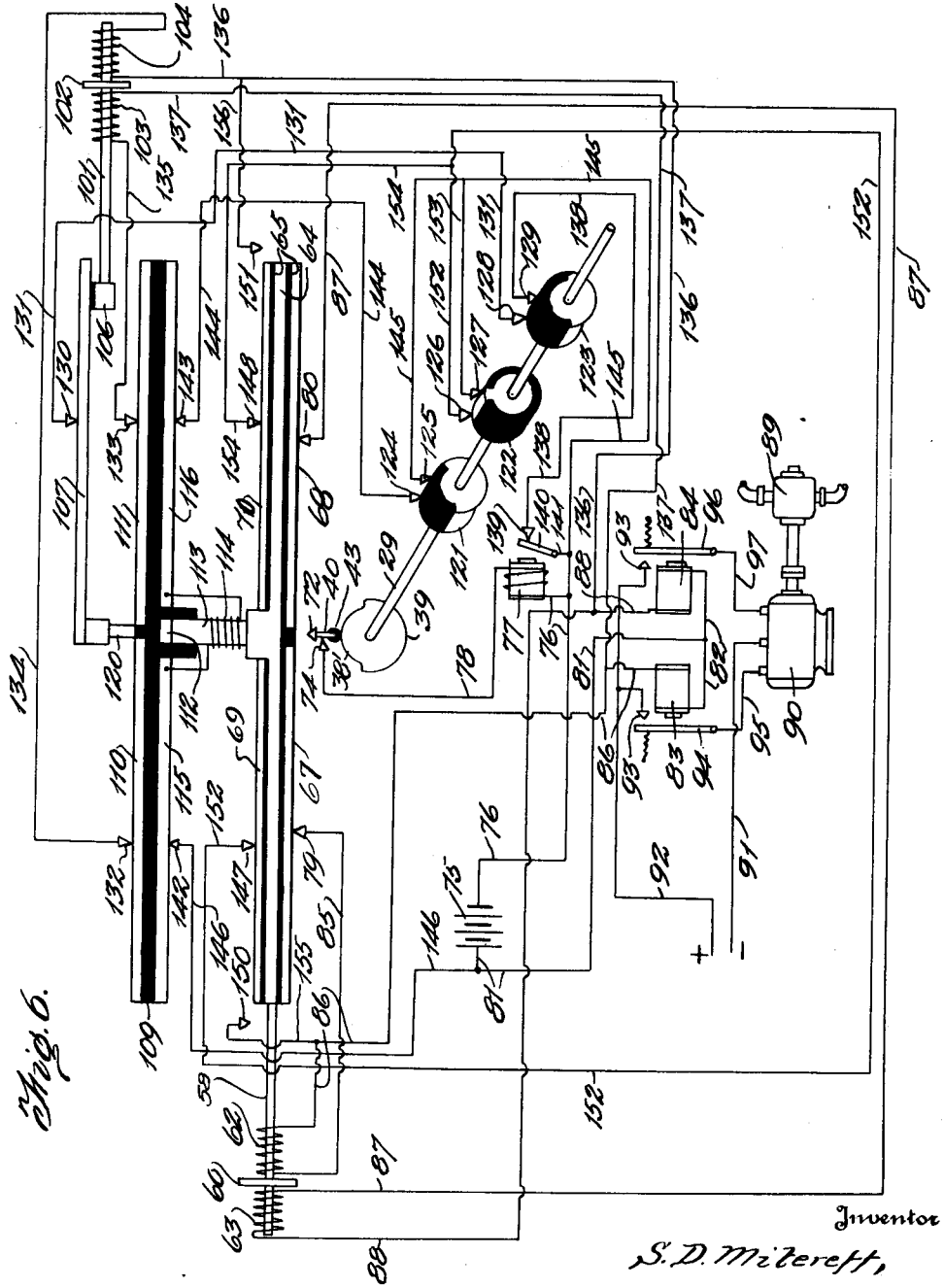

Patented Apr. 17, 1934

1,955,680

UNITED STATES PATENT OFFICE 1,955,680

AUTOMATIC ELECTRIC REGULATOR

Sergei D. Mitereff, Petersburg, Va.

Application November 10, 1931, Serial No. 574,236

20 Claims. (Cl. 172—239)

This improvement relates to an apparatus for automatically maintaining, in a given system, constant within narrow limits a variable element such, for example, as pressure, temperature, liquid level, chemical composition of a mixture, speed, etc., by varying the flow of matter or energy to or from the system in accordance with the deviation of the variable element from its normal value desired to be maintained constant.

More particularly this improvement relates to that class of automatic control apparatus in which the impulse receiving end of the control apparatus is connected with the flow regulating mechanism proper, a valve for example, by means of an electric circuit.

In the great majority of automatic controls of this type the speed and the amount of movement of the flow regulating mechanism is determined by either the frequency or duration or both of the intermittent closing of the electric circuit, operating the flow regulating mechanism, by the impulse receiving end of the control.

The greatest drawback of the regulators of this type, known to the art previous to this invention, is that the frequency and/or duration of the electrical impulses sent to the flow regulating mechanism depend only on the amount of the deviation of the variable element, desired to be kept constant, from its normal value and sometimes only on the sign of this deviation, without depending at all directly and distinctly on the rate at which the variable element is decreasing or increasing.

Even then, the proper and accurate graduation of the electrical impulses in accordance with the amount of deviation of the variable element is seldom, if ever, attained.

Since the rate of change of the variable element, considered independently from the amount of deviation of the element, is at least as important an indication as is the amount of its deviation of what is going on in the system of which the variable element is a part, the failure of the regulator to respond directly and distinctly to the rate of change of the variable element imposes a very considerable limitation upon the accuracy of control obtainable with the type of the regulators known previous to this invention.

To overcome this drawback of an ordinary regulator of the electrical impulse sending type, I have devised an automatic control apparatus which varies the duration of electrical impulses, not only in response to the amount of deviation of the variable element to be kept constant from its normal value, but also and primarily to the rate at which the element changes. Moreover, the length of the electrical impulses sent to the flow regulating mechanism is accurately graduated strictly in accordance with the predetermined theoretical requirements at any given moment instead of certain, sometimes very rough, approximations to a desired characteristic featured by the great majority of the regulators of the electrical contact making type.

In order to illustrate the principle on which my invention is based and the preferred means by which this principle may be reduced to practice the reference is made to drawings attached to this specification.

In the accompanying drawings like characters of reference indicate like parts in the several views, and:

Figure 1 is a front elevation, partly in section and partly diagrammatic of the complete invention.

Figure 2 is an enlarged detail section on the line 2—2 of Figure 1.

Figure 3 is a section on the line 3—3 of Figure 2.

Figure 4 is a detail section on the line 4—4 of Figure 2.

Figure 5 is a section on the line 5—5 of Figure 4.

Figure 6 is a wiring diagram of the invention.

In the embodiment of the invention as here shown there is provided a base 10 wherefrom rises a frame having side members or standards 11 and a cross-bar 13 connecting these standards adjacent their upper ends. Mounted on the cross-bar or platform 13 is a motor 14 which runs continuously during the operation of the regulator and is of the constant speed type. The standards 11 are of insulating material in order that various conductive parts, hereinafter described as supported or carried by said standards may be properly insulated from each other. Obviously, the entire standards need not be of insulating material but only those parts contacting with the conductive parts need to be of insulation. However, for the sake of simplicity the standards are indicated as homogeneous. To one end of the motor shaft is connected a shaft 15 which is supported at the end adjacent the motor by a bearing 16 carried by the frame.

Mounted on the base 10 is a pair of spaced standards 17 having at their upper ends bearings 18 wherein the outer end of the shaft 15 is journalled. A pinion 19 is keyed to the shaft 15 adjacent the outer standard 17 and this pinion 19 meshes with an idler 20 carried on a stub shaft 21 fixed to the standard. Aligned bearings 22 are formed on the standards and project away from each other. The hub 23 of a soft iron gear 24 is supported in the outer bearing 22 and this gear meshes with the idler gear 20. The gear 24 also meshes with a gear 25 mounted on a shaft 26 supported at one end in the hollow shaft 32, the outer end of shaft 26 being journalled in the outer standard 17. The gear 26 carries a pinion 27 which meshes with gear 28. The gear 28 carries a pinion 30 which meshes with a gear 31 formed on the outer end of a sleeve 32 which is journalled in the inner standard 17. Gear 28 and pinion 30 are mounted on shaft 29 and can rotate independently of shaft 29.

A gear 33 is formed on the inner end of the sleeve 32 and meshes with a gear 34 keyed on the shaft 29. The train of gears just described, beginning with the pinion 19 and terminating with the gear 34 thus forms a reduction train so that the shaft 29 revolves at considerably less speed than the shaft 15.

The inner end of the shaft 29 extends through and is journalled in one of the standards 11. A bevel gear 35 is fixed on the inner end of the shaft 29 and meshes with a bevel gear 36 fixed on a shaft 37 supported in bearings 38' centrally between the frame members 11. On the shaft 37 is also fixed a cam having a short arcuate portion 38 of minor radius and a long arcuate portion 39 of major radius. A bar 40 finely serrated on its upper face has legs 41 which work in vertical guides 42 formed on the standards 11. A cam roller 43 is carried by the central portion of the serrated bar 40 and rests on the cam so that with the roller engaging the portion 38 the bar is in depressed position and with the roller engaging the portion 39 the bar is in raised position. Thus the motor 14 acts to alternately raise and lower the bar 40 and the bar 40 is a transversely extending and vertically reciprocating bar which, as will presently be understood, forms a latch bar for one of the elements of the device.

Coupled to the remaining end of the motor shaft is a shaft 44 which, like the shaft 15 is supported at its inner end in a bearing 45, carried by the insulating frame, and at its outer end in bearings 46 formed at the upper ends of standards 47. Keyed to the shaft 44 is a gear 48 which meshes with a soft iron gear 49 having a hub 50 journalled in a bearing 51 projecting inwardly from the inner standard 47. Also keyed to the shaft 44 is a gear 52 which meshes with an idler gear 53 carried on a stud shaft 54 supported by the outer standard 47. The idler gear 53 meshes with a gear 55 of soft iron having a hub 56 journalled in a bearing 57 extending outwardly from the outer standard 47 and aligned with the bearing 51. It should be here noted that the standards 17 and 47 are preferably formed of non-magnetic material such as bronze or some non-ferrous material. As will be seen from the drawings, the gears 49 and 55 lie in spaced relation. The hubs 50 and 56 are of tubular formation and serve as bearings for a shaft 58 which is provided with collars 59 so that, while it may freely rotate, this shaft is immovable longitudinally. Shaft 58 is threaded on its right hand end where it enters threaded bore of bar 64. Splined on the shaft 58 between the gears 49 and 55 is a disk 60 having a hub 61 forming a double faced friction clutch adapted for selective engagement with the gears 49 and 55. The bearings 51 and 57 are shaped exteriorly to form spools for magnet windings 62 and 63 respectively. The disk 61 is of magnetic material such as soft iron and thus forms an armature for the magnets formed by the windings 62 and 63. Thus, if one of these windings be energized the disk 60 will be attracted and the clutch 61 brought into clutching relation with a respective gear 49 or 55 so that the shaft 58 will be caused to revolve with that gear. It will be noted that the gear 49 revolves in a direction opposite the shaft 44, being geared directly thereto, while the gear 55 revolves in the same direction as the shaft 44 because of the interposition of the idler gear between the gears 52 and 55. Thus the gears 49 and 55 revolve constantly in opposite directions. The gears just described are preferably so proportioned as to make gears 49 and 55 to rotate at the same speed. The standards 11 are provided with rectangular guide openings aligned with the shaft 58 and in these openings slides a lower contact bar having a body 64 of soft iron. On the under side of this body is fixed an insulating plate 65 having chamfered ends 66. Embedded in the under side of the insulating plate so as to lie flush with the under face thereof are four conductor strips 67, 68, 69 and 70. The strips 67 and 68 are aligned at one edge of the plate 65 in longitudinally spaced relation and the strips 69 and 70 are similarly aligned at the other edge, the strips at one edge being spaced from the strips at the other edge. The lower and contact provided face of this bar is spaced above the bar 40 and this bar 64 with its strips may be termed the lower contact bar. Between the lower contact bar and the bar 40 is a conductive socket 71 carrying a spring pressed contact brush 72. The bottom of the socket 71 is serrated to correspond to the serrations of the bar 40 which, it will be noted, is also of conductive material, the roller 43 being of insulation. This socket 71 is carried on the pointer or arm of a suitable gage of the type wherein a pointer traverses a rectilinear scale, the pointer of course moving in a straight or substantially straight line. The construction of the gage forms no part of the present invention, such gages being commercially available for practically all purposes. It is merely necessary that the gage be of a type wherein the scale is uniform throughout and that the pointer or arm carrying the socket 71 be capable of being set. The arm 73 carrying the socket 71 is sufficiently resilient to permit movement of the socket from its normal position to its raised position to bring the contact 72 into engagement with the lower contact bar. The contact 72 is set so that normally (if the pressure or other function being regulated is at the desired point) the raising of the socket by the bar 40 in its constant vertical reciprocations, will merely cause the contact 72 to engage the strip of insulation 65 between the conductor strips 67 and 68. If, however, the function being regulated varies above or below the desired point the socket 71 will move to the left or right as the case may be and the next reciprocation of the bar 40 will bring the contact 72 into engagement with the conductor strip 67 or the conductor strip 68 according to the direction of movement. Moreover, the serrations will prevent lateral movement of the socket while in its raised position and, it will be noted, the bar 40 is raised substantially three-fourths of the time so that shifting laterally of the socket can only take place during the short periods the bar 40 is dropped.

Socketed in one of the standards 11 is a spring pressed contact 74 which bears against one of the legs 41 of the bar 40. On the base 10 is mounted a battery 75 and from one terminal of this battery leads a wire 76 which is connected to one terminal of the winding of a delayed relay magnet 77. A wire 78 connects the other terminal of this relay magnet with the contact 74. A spring pressed contact 79 is socketed in the left hand standard 11 and a similar contact 80 is socketted in the right hand standard 11, these contacts having constant engagement with the respective strips 67 and 68. Thus, whenever the contact 72 is out of normal position to engage the strip 67 or the strip 68, the engaged strip is electrically connected to the battery. The remaining terminal of the battery 75 is connected by a wire 81 to branch wires 82 leading respectively to one of the terminals of respective relay magnets 83 and 84. A wire 85 connects the contact 79 with one terminal of the winding 62 and from the other terminal of this winding 62 a wire 86 leads to the remaining terminal of the magnet 83. Similarly, from the contact 80 a wire 87 leads to one terminal of winding 63 and a wire 88 connects the remaining terminal of this winding with the remaining terminal of magnet 84. In this way, whenever the contact 72 engages strip 67 current will flow from battery 75 through wire 76, magnet 77, wire 78, contact 74, bar 40, contact 72, strip 67, contact 79, wire 85, winding 62, wire 86, magnet 83, wire 82, and wire 81 back to battery 75. If the contact 72 is in engagement with strip 68 then the current flows as before to contact 72 and from there through strip 68, contact 80, wire 87, winding 63, wire 88, magnet 84, wire 82, and wire 81 back to the battery. Now, when the winding 62 is energized the armature 60 clutches to the gear 49 and the screw 58 is revolved to move the lower contact bar to the left and thus to move the insulation between strips 67 and 68 into contact with the contact 72 thereby breaking the circuit. A like effect with the lower contact bar moving toward the right is produced when the winding 63 is energized.

At 89 is indicated a controlling device, as, for instance, a valve and this controlling device is actuated by a motor 90 of the constant speed reversible type. A line wire 91 has the motor windings connected in multiple thereto. A second line wire 92 has a pair of fixed contacts 93 connected in multiple thereto. The magnet 83 is provided with an armature 94 which is normally open from its contact 93 and which is connected to the remaining terminal of one winding of the motor 90 by a wire 95. Similarly, the magnet 84 has an armature 96 connected to remaining terminal of the other winding of the motor 90 by a wire 97. It will be plain that whenever the contact 72 is in engagement with a respective strip 67 or 68 the corresponding magnet 83 or 84 will be energized and the motor driven in one direction or the other as the case may be.

Fixed upon the shaft 15 is a pinion 98 which meshes with a soft iron gear 99 provided with a hub 100 journalled in the bearing 22. The hub 100 is aligned with the hub 23 and these hubs are of tubular construction to constitute bearings for the screw 101. It will be noted that the gears 24 and 99 revolve in opposite directions. Splined to the screw between said gears is a disk 102 of magnetic material such as iron and this disk constitutes an armature for the windings 103 and 104 which are wound on the bearings 22. Disk 104 forms thus a double faced friction clutch adapted for selective engagement with gears 99 and 24. Collars 105 prevent longitudinal movement of the screw 101.

Slidably mounted in the standards 11, adjacent the tops thereof, is an upper contact bar 106 which is rectangular in cross-section and is formed preferably of insulating material. On top of this bar 106 at its right hand end is fixed a conductor strip 107 which slightly overlaps the central portion of the bar. A threaded bore 108 is formed in this end of the bar 106 and receives the screw 101. By reason of this construction when the screw revolves in one direction the bar 106 moves to the right and when the screw revolves in the other direction the bar moves to the left. Obviously, the rotation of the screw in one direction and the other is controlled, as with the screw 58, by the energization of the respective winding 103 and 104. Slidably mounted in the standards 11, between the bars 64 and 106 is a middle contact bar 109 formed of insulating material and rectangular in cross-section. On top of this bar is a pair of conductor strips 110 and 111 which have their adjacent ends separated by a rib of the insulating material at the center of the bar and which run from that rib to the ends of the bar. In the under side of the bar, at its center, is formed a socket 112. A magnet core 113 is mounted in this socket for vertical sliding movement and the lower end of this core rests on the magnetic material 64 of the lower contact bar. Surrounding the lower portion of the magnet core is a winding 114 the terminals of which are connected respectively to contact strips 115 and 116 fixed on the lower side of the bar 109. Mounted in the standards 11 in horizontal alignment with the winding 114 are tubular spring sockets 117. Rods 118 extend axially through these sockets and have heads at their inner or adjacent ends which bear against the winding 114. Springs 119 surround these rods and each bears at one end against the respective rod head and at its other end against the bottom of the respective socket 117. Thus the winding 114, and consequently the bar 109, is constantly urged to normal and central position between the standards 11. In the bar 106, centrally thereof, is a socket having its upper end closed by the inner end of the strip 107 and in this socket is mounted a spring pressed plunger or contact 120. The spring of this contact bears against the strip 107 and thus the contact 120 is in conductive connection with the strip 107. Mounted on the shaft 29 to rotate therewith are three drums indicated respectively at 121, 122 and 123. These drums each have one peripheral portion of conductive material and the remaining peripheral portion of insulating material. Bearing on these drums are pairs of contacts, the contacts for the drum 121 being indicated at 124 and 125, those for the drum 122 at 126 and 127 and those for the drum 123 at 128 and 129. Socketed in the left standard 11 is a spring pressed contact 130 which engages the strip 107. The contact 130 is connected by a wire 131 with contact 128. In the standards 11 are spring contacts 132 and 133 which engage respectively with strip 110 and strip 111. A wire 134 connects contact 132 with one terminal of the winding 104 and a wire 135 connects contact 133 with one terminal of the winding 103. The remaining terminal of winding 104 is connected by a wire 136 with the wire 88 and thus to the battery 75 as will be presently traced. A wire 137 connects the remaining terminal of the winding 103 with the wire 86 and similarly to the battery. A wire 138 connects the contact 129 with the fixed contact 79 associated with the relay magnet 77 and an armature 140 forms a contact which is normally closed against the contact 139 and is opened therefrom upon energization of the magnet 77. A wire 141 connects armature 140 to wire 76 and thus to the battery.

The means controlling the movement of the bar 109 will presently be described but, at this time, it will be noted that the bar 109 does move and that normally the contact 120 rests on the insulation between strips 110 and 111. If the bar 109 moves to the right then contact 120 engages strip 110 and current will flow from the battery 75 through wire 76, wire 141, armature 140, contact 139, wire 138, contact 129, conductive segment of drum 123, contact 128, wire 131, contact 130, strip 107, contact 120, strip 110, contact 132, wire 134, winding 104, wire 136, wire 88, magnet 84, wire 82, and wire 81 back to battery 75. This will cause energization of winding 104 and clutching of disk 102 to gear 24 so that screw 101 will revolve in such direction as to cause contact 120 to move to the right towards the insulation on which it normally rests. Obviously when on this insulation the circuit just described is broken. Also, it will be obvious that energization of magnet 77 will break the circuit by opening contact 140 from contact 139. Similarly, if bar 109 moves to the left current will flow from the battery to contact 120 as before and from contact 120 through strip 111, contact 133, wire 135, winding 103, wire 137, wire 86, magnet 83, wire 82 and wire 81 back to battery 75. The disk 102 will then be clutched to gear 99 and the screw rotated to move contact 120 to the left towards the insulation on which it normally rests. In the first case magnet 84 will be energized and in the second case magnet 83 will be energized and the controlling device 89 will be actuated as previously described.

In the standards 11 are spring pressed contacts 142 and 143 which bear respectively on the strip 115 and the strip 116. A wire 144 connects contact 143 with contact 124 and a wire 145 connects contact 125 with wire 76 and thus to battery 75. A wire 146 connects contact 142 with wire 81 and thus to battery 75. Under these conditions, whenever the contacts 124 and 125 rest on the conductive segment of drum 121 as the shaft 29 revolves current will flow from battery 75 through wire 76, wire 145, contact 125, drum 121, contact 124, wire 144, contact 143, strip 116, winding 114, strip 115, contact 142, wire 146 and wire 81 back to the battery 75. Thus the core 113 will be energized and be magnetically clutched to the bar 64 so that movement of the bar 64 effects corresponding movement of the bar 109.

Mounted in the standards 11 are contacts 147 and 148 which engage respectively with the strip 69 and the strip 70. Brackets 149 carry spring pressed contacts 150 and 151 which normally lie spaced from the outer ends of the respective strips 69 and 70 but which are engaged by these strips as the bar 64 moves to the left or right respectively. A wire 152 connects the contact 147 to contact 126 and a wire 153 connects contact 127 to wire 145 and thence through wire 76 to the battery 75. Similarly a wire 154 connects contact 148 to wire 152 and thus to the battery 75. A wire 155 connects contact 150 to wire 86 and a wire 156 connects contact 151 to wire 136. Now, if the bar 64 moves to the right contact 151 rides on strip 70 and the current will flow from battery 75 through wire 76, wire 145, wire 153, contact 127, drum 122, contact 126, wire 152, wire 154, contact 148, strip 70, contact 151, wire 156, wire 136, wire 88, magnet 84, wire 82, and wire 81 back to the battery thus energizing magnet 84. If the bar 64 be moved to the left to bring strip 69 into engagement with contact 150 then current will flow as before from battery 75 to wire 152 and from that wire to contact 147, strip 69, contact 150, wire 155, wire 86, magnet 83, wire 82, and wire 81, back to the battery 75, thus energizing magnet 83.

The contact plate or segment of the drum 121 is so located and is of such a length as to engage to engage the brushes 124 and 125 from the moment the cam segment 39 engages the roller 43 to raise the bar 40 until the roller passes off that segment and the bar drops.

The contact plate or segment of the drum 122 is so located and is of such a length as to engage the brushes 126 and 127 for a very short time at about the middle of the period during which the bar 40 is lowered.

The drum switch 123 has its contact segment so located and of such an extent that it engages the brushes 128 and 129 after the bar 40 is raised and moves out of such engagement just before the bar is lowered.

From the description above of the circuit including the drum 121 it will be seen that the drum 121 is the sole means for opening and closing the circuit through winding 114 and that such circuit will be closed only when the bar 40 is raised. Consequently the bar 109 will be magnetically clutched to the bar 64 only when the bar 40 is raised.

As previously described, the circuits of the drum 122 include the contacts 150 and 151. Accordingly, when the bar 64 is in position to close a circuit to one of these contacts, the corresponding circuit will be closed for a short time at the lowered position of the bar 40 through a respective magnet 84 or 83 independently of other circuit closers.

Finally, the drum 123 controls the circuit to contact 120 so that if this contact is in engagement with either strip 110 or strip 111 and the armature 140 is closed on contact 139, a circuit will be closed through the corresponding winding 104 or 103 and relays 84 or 83 respectively. The relay 77 including the armature 140 is delayed action relay and opens this circuit the moment the current starts to flow through contact 72 but permits the circuit to close a few moments after contact 72 opens. The circuit of drum 123 and contact 72 are thus interlocked.

As perviously stated, the device shown at 89 indicates typically any means for regulating flow of fluid or power which flow affects the quantity it is desired to keep constant. In other words, 89 may be said to be the controlling device of a function of a force.

As was explained before, the amount of positive or negative deviation of this quantity from its normal value is proportional to the distance traveled by the arm 73, to the left or to the right respectively, from its middle position between standards 11.

In order to facilitate the explanation of the operation of this control mechanism, it will be assumed that the specific problem under consideration is to keep the pressure constant in a tank. It will be accordingly assumed that 89 represents a valve which admits gas under pressure into the tank where it is desired to keep constant pressure irrespective of the variable uncontrollable outflow of gas from the tank.

High-potential electric current for operation of motor 90 is supplied by means of wires 91 and 92, from any convenient source. The middle terminal of motor 90 is permanently connected to wire 91. The direction of rotation of motor 90 is determined by whether wire 95 or 97 is connected to wire 92. These connections are established by means of relays 83 and 84 respectively.

For the particular case under consideration it will be assumed that when relay 83 is energized, valve 89 is closing, and when relay 84 is energized, valve 89 is opening.

The source of low potential electric energy for operation of different circuits of the control mechanism is battery 75 which may be a storage battery.

The electric circuits connecting different contacts, contact strips, and windings of the control mechanism, are clearly shown in Figure 6 by a conventional wiring diagram.

It can be seen from the wiring diagram that relays 83 and 84 are operated by the control circuits fed by battery 75. The relay arrangement is made only in order to protect delicate brushes of the control mechanism from destructive sparking in breaking the circuit which would result if the powerful current of motor 90 were passing through these brushes.

The examination of control circuits discloses that valve 89 is closing whenever either of the contacts 72, 150 or 120 are in contact with contact strips 67, 69 and 111 respectively, provided, of course, that drum switches 122 and 123 and relay 77 are closed. Likewise, valve 89 is opening whenever either of the contacts or brushes 72, 151 and 120 is in contact with copper strips 68, 70 and 110 respectively, provided drum switches 122 and 123 and relay 77 are closed.

The examination of control circuits discloses also that winding 62 and winding 63 are respectively energized whenever brush 72 is in contact with copper plates 67 and 68 respectively. Since winding 62 and winding 63, when energized, result in bar 64 moving to the left or to the right respectively, it means that brush 72 will stay in contact with either copper strip 67 or 68 only as long as it will take to bring the insulating strip between plates 67 and 68 opposite brush 72, at which moment, of course, the movement of bar 64 will cease. It is clear therefore that the length of time during which brush 72 will stay in contact with plate 67 or 68 from the moment it touches this plate, will be proportional to the distance of brush 72 from the middle of bar 64 at the moment of contact.

Since valve 89 is either opening or closing at a constant speed as long as current is flowing through brush 72, it follows that the amount of movement of valve 89, due to operation of brush 72, is also proportional to the distance of brush 72 from the middle of bar 64 at the moment of contact.

The examination of the electric circuits discloses further that windings 103 and 104 are energized whenever brush 120 is in contact with strips 111 and 110 respectively. Since coils 103 and 104, when energized, result in bar 106 moving to the left or to the right respectively, it means that brush 120 will stay in contact with either strip 110 or 111 only as long as it will take to move bar 106 from the position occupied at the moment switch 123 and relay 77 closes the circuit to the position at which brush 120 will rest on insulating strip separating strips 110 and 111. At this moment the movement of bar 106 will cease, of course.

It is clear, therefore, that the length of time during which brush 120 will stay in contact with either strip 110 or 111 from the moment circuit is closed by switch 123 and relay 77 will be proportional to the distance of brush 120 from the middle of bar 109 existing at the moment the circuit is closed.

Since valve 89 is either opening or closing at a constant speed as long as current flows to brush 120 it follows that the amount of movement of valve 89, due to operation of brush 120, will be also proportional to the distance of brush 120 from the middle of the bar 109 existing at the moment circuit is closed.

The examination of the control circuits discloses further that as long as bar 64 is to the left or to the right from its middle position either brush 150 or brush 151 will be in contact with strips 69 and 70 respectively and that the current will be flowing to that brush which is in contact with the plate for a very short period corresponding to the length of time drum switch 122 stays closed.

Since valve 89 is closing or opening at a constant speed as long as current is flowing through brush 150 or brush 151 respectively, it follows that as long as bar 64 is not in its middle position valve 89 will keep on moving an equal short distance for each revolution of drum switch 122 and the cam.

The complete sequence of operation of different contacts for each revolution of the cam and starting from the part of the cycle when roller 43 starts to rise on the cam is as follows: At this starting moment drum switch 121 closes and sends current through winding 114 of the core 113 with the result that bar 109 is clutched to bar 64. Drum switch 123 at this moment is open and no current can flow through brush 120 irrespective of position of bar 106 in respect to bar 109. A few moments later the cam lifts bar 40 which in turn bends upward arm 73 locking it at the same time and preventing it from moving sidewise. As soon as brush 72 touches the lower face of bar 64 current starts to flow through brush 72 with the result that bar 64 starts to move, provided, of course, brush 72 did not happen to be opposite the middle of bar 64. Since bar 109 is now engaged to bar 64 it will move also in the same direction and the same distance as does bar 64. The moment current starts to flow to brush 72 it will open relay 77 so that no current will flow to brush 120 as long as it flows through brush 72. At the same time current to brush 72 will close either relay 83 or 84 and this will start the motor 90 of valve 89.

After a while current through brush 72 will be interrupted by the movement of bar 64 and the movement of bar 64 and motor 90 will cease. A few moments later delayed relay 77 will close and permit current to flow through brush 120, provided that at that time drum switch 123 is already closed as it would be under ordinary circumstances. At that moment current starts to flow through brush 120 with the result that bar 106 starts to move. At the same time either relay 83 or 84 will be closed and motor 90 of valve 89 will start to rotate. After a while current through brush 120 will be interrupted by the movement of bar 106 so that the movement of bar 106 and motor 90 will cease.

Nothing will happen next until the cam starts to lower bar 40. At that moment circuit of brush 120 will be opened by the switch 123. This will ordinarily produce no effect since the current through brush 120 has been ordinarily already interrupted by bar 106. A few moments later bar 40 will drop to its low position and contact between brush 72 and lower face of bar 64 will be broken. This will produce no effect either since current to brush 72 has been interrupted already by bar 64. At the same moment drum switch 121 will interrupt current through coil 114. Bar 109 and bar 64 will thus be disengaged and bar 109 will be returned to its middle position by the action of either spring 119. After a short while when roller 43 will be in the middle of the low portion of the cam, drum switch 122 will close the circuit of brushes 150 and 151 for a very short period, and current will flow through either brush 150 or 151 depending upon position of bar 64, provided it is not in the middle position. This current will operate either relay 83 or relay 84 with the result that motor 90 of valve 89 will move a small distance either closing or opening the valve as the case may be. After drum switch 121 opens the circuit of brushes 150 and 151 nothing will happen until the completion of the cycle at the moment the cam starts to lift bar 40.

The manner in which the above described cyclical operation of control mechanism is applied for the particular problem under consideration, namely, that of maintaining constant gas pressure in a tank, is as follows:

For the sake of definiteness let it be assumed that the length of each cycle is one minute, that means, of course, that the cam is rotating at the speed of one revolution per minute.

As a convenient starting condition let it be assumed that pressure in the tank is at its normal value and that bars 64, 109 and 106 are in their middle position. Normal pressure in the tank will mean that arm 73 is also in the middle position. It will be clear from the previous explanation of working of separate parts of the control mechanism that under these conditions no current will flow through any of the brushes except brushes 124, 125 and brushes 142 and 143, and that no movement of any of the bars or valve 89 will take place as long as pressure stays at its normal value. Of course, the cam will rotate and will lift arm 73 every minute, and also drum switch 121 will send current through winding 114. Let it be assumed also that at the starting position, valve 89 is in partially open position, and that it admits just enough gas to the tank to compensate for the flow of gas from it, this, of course, is a necessary condition for a steady pressure.

Now, let it be assumed that pressure in the tank starts to rise at a slow rate at first and then faster and faster. Then, every succeeding minute, as soon as arm 73 is lowered and released by bar 40, it will move a step to the left from its middle position. These steps, that is the distance between each succeeding position of arm 73, after being raised by bar 40, will be proportional to the average rate at which pressure was rising during the preceding minute. On the other hand, the total distance which arm 73 traveled to the left from its middle position will be proportional to the amount of deviation of pressure in the tank from its normal value.

As soon as arm 73 starts to move in steps to the left the middle point of bar 64 will follow it after each step. In this way the total length of time required to move bar 64 in following arm 73 will be proportional to the total amount of deviation of pressure in the tank from its normal value. This means that valve 89 will be moved toward its closed position, due to operation of bar 64, to a distance proportional to the total rise of pressure from its normal value.

In addition to this at each one minute cycle, bar 109 will be moved to the left a distance equal to the lengths of each step of arm 73 only to be returned at the end of the cycle to its middle position by the action of springs 119. Each cycle, bar 106 and brush 120 will be moved to follow the middle point of bar 109, to be left in that new position until the next cycle.

In a general case, whether the bar 106 will move to the left or to the right at each cycle, depends entirely upon whether or not the step made by arm 73 is greater or smaller than was the preceding step.

Since, however, in this particular case it was assumed that pressure is rising at an ever increasing rate, it means that each succeeding step of arm 73 is longer than the preceding one. In this way brush 120 would be moved farther and farther to the left. The total distance traveled by brush 120 will be equal therefore the length of the step of arm 73 just previous to the moment under consideration. Since the length of each step of arm 73 is proportional to the rate at which pressure is rising, it means that the total distance traversed by bar 106 and brush 120 from their middle position will be proportional to the rate of change of pressure. This means also that the total amount of time during which bar 106 was in motion, until the moment under consideration, will be proportional to the rate of increase of pressure in the tank at that moment.

Since valve 89 is closing as long as bar 106 is moving, to the left, it means also that the total distance travelled by valve 89 toward its closed position, due to operation of bar 106 will be proportional to the rate of change of pressure in the tank at the moment under consideration.

Since the effects of operation of bar 64 and bar 106 on the movement of valve 89 are additive, the total net effect of the control mechanism on the movement of valve 89 can be expressed mathematically, therefore, as follows:

$$F = k_1 P + k_2 \frac{dP}{dT} \quad \text{------------} \quad (1)$$

Where:

F—Distance traveled by the valve 89 from the position it occupied at the starting point.

P—Amount of deviation of pressure from its normal value which it had at the starting point.

T—Time.

$k_1, k_2$—Arbitrary constants of proportionality depending upon the adjustment of control mechanism.

d—Mathematical symbol used in calculus designating an infinitesimally small increment.

This expression is not exact due to inaccuracy introduced by the step to step motion of the valve 89. This inaccuracy can be reduced, however, to no matter how small value by shortening the length of each cycle, therefore, equation (1) represents really the limit to which the characteristic of the control will approach when the length of cycle is made very small.

The necessity of this mathematical formulation of the principal characteristic of my control apparatus arises primarily from some uncertainty existing in regard to exact meaning of the expression "rate of change" whereas the mathematical expression of the same concept, namely $$\frac{dP}{dT}$$

leaves no argument as to its meaning.

In the above explanation no mention has been made yet of the effect of operation of brushes 150 and 151.

The effect of operation of these brushes is to move valve 89 a very short distance at the end of each cycle toward its closed or open position as long as the pressure stays above or below its normal value respectively. Thus the same pressure is maintained at high rate as at low rate of flow of fluid through valve 89. Therefore the complete mathematical expression of the characteristic of my control is as follows:

$$F = k_1 P + k_2 \frac{dP}{dT} + k_3 T \quad\quad\quad\quad (2)$$

Where the same notations are used as in case of expression (I) except that $k_3$ is still another arbitrary constant of proportionality which depends solely upon the adjustment of the regulator.

It should be noted that term $k_3 T$ is of a relatively small importance compared to the other two terms of the right hand side of the equation (2). This is accomplished by making constant $k_3$ very small compared to the constants $k_1$ and especially constant $k_2$.

It will be clear to those skilled in the art that, if instead of rising, the pressure in the tank will start to fall, the movement of bars and therefore of valve 89 will be in the opposition direction. Except for the signs this will not however change the equation (1) and equation (2).

The advantage of a control of the above expressed characteristic is that the rate of flow of fluid passing through valve 89 will be increased or decreased as soon as the pressure starts to change at a certain rate with the result that if this rate is high valve 89 will move a considerable distance and will change considerably the rate of flow of fluid through it even though the actual deviation of pressure may still be very small.

In this way a change of pressure is forestalled at its very inception and a very close regulation without "hunting" is thus made possible. It should be mentioned that equally good results cannot possibly be attained with an ordinary regulator which responds in one way or another only to the deviation of pressure from its normal value, without responding distinctly and directly, as does my regulator, to the rate of change of pressure, no matter how sensitive this ordinary regulator may be. This is due to the fact that in any given control system there exists an unavoidable time lag in impulse transmitting means, such as a pilot line, for example, which time lag gives rise to difficulties known to the art as "hunting" if the sensitiveness of the ordinary regulator is increased beyond the optimum limit for that particular control system.

With my regulator, however, its sensitiveness can be increased almost indefinitely without running into "hunting". This is due to the fact that the rate responsive means of my regulator counteract the time delay caused by the inherent sluggishness of a given control system.

Since, as it was explained previously, the pointer 73 of Fig. 2 may belong to any indicating instrument whatsoever, and since by numeral 89 is indicated any flow regulating means, flow through which affects in some definite way the quantity indicated by the position of the pointer 73, it follows that the field of application of my regulator is in no way limited to the pressure control, which was taken simply as an example to facilitate the explanation of the functioning of the regulator, but that is equally well applicable, to temperature, speed, flow, mixture, composition, liquid level, steering and many other kinds of automatic regulation.

I claim:

1. In a regulator for fluid or energy supply an impulse receiving element having normally locked indicating means moving upon release proportional to the magnitude of changes of the impulse, depressor means locking and releasing the indicating means at regular intervals, first electrical contact making and breaking movable means arranged to move at a constant speed a distance proportional to the travel of the indicating means, this movement starting after the indicating means are locked and stopping before the indicating means are released, a second electrical contact making and breaking movable means having a clutch engaging the first contact making and breaking means before that means start to move and releasing it after that means stop to move, means returning the second electrical contact making and breaking means to its original position as soon as the clutch is released, a third electrical contact making and breaking movable means arranged to move at a constant speed a distance proportional to the difference of two succeeding distances traveled by second electrical contact making and breaking means, this movement starting after the movement of the first contact making and breaking means is stopped and ending before the clutch is released, a constant speed reversible motor operated flow regulating means proper, two circuits connecting the first and the third contact making and breaking means with the forward and reverse terminals of the motor of the flow regulating means, one of these circuits being so arranged as to be closed and to carry current and to move forward the motor as long as either the first or the third contact making and breaking means is moving in the forward direction, while another of these circuits is so arranged as to be closed and to carry current and to reverse the motor as long as either the first or the third contact making and breaking means is moving in the backward direction, a switch making a short duration contact at regular intervals and sending current to the forward or backward terminal of the motor depending on the positive or negative distance of the first contact making and breaking means from its neutral position corresponding to the neutral position of the indicating means and a suitable timing device preventing overlapping and interference between the operation of contact making and breaking means.

2. In a regulator for fluid or power supply operating in cyclical manner, three movable elements, flow regulating means proper for the fluid or power supply, an indicating instrument uniformly actuated by the function dependent upon this fluid or power supply, means working from and in conjunction with the indicating instrument to move at each cycle the first movable element a distance proportional to the increment of actuation of the indicating instrument for the previous cycle, means working from and in conjunction with the first movable element to move at each cycle the second movable element a distance from its normal neutral position proportional to the increment of movement of the first movable element for each cycle, means for returning the second movable element to its neutral position at the conclusion of each cycle, means working from and in conjunction with the second movable element to move the third movable element a distance sufficient to make its neutral point coincide with the neutral point of the second movable element at the conclusion of the movement of the second movable element for each cycle and before this element is returned to its neutral position, means translating and combining at the conclusion of each cycle the movement of the first and third movable elements for each cycle into a movement of the flow regulating member proper so as to make the net distance traversed by the flow regulating means proper for each cycle proportional to the algebraic sum of the separate distances traversed by the first and third movable elements for each cycle.

3. In a regulator for fluid or power supply operating in cyclical manner, three movable elements, flow regulating means proper for this fluid or power supply, an indicating instrument uniformly actuated by the function dependent upon this fluid or power supply, means working from and in conjunction with the indicating instrument to move at each cycle the first movable element a distance proportional to the increment of actuation of the indicating instrument for the previous cycle, means working from and in conjunction with the first movable element to move at each cycle the second movable element a distance from its normal neutral position proportional to the increment of movement of the first movable element for each cycle, means of returning the second movable element into its neutral position at the conclusion of each cycle, means working from and in conjunction with the second movable element to move the third movable element a distance sufficient to make its neutral point coincide with the neutral point of the second movable element at the conclusion of the movement of the second movable element for each cycle and before this element is returned into its neutral position, means translating and combining at the conclusion of each cycle the movement of the first and third movable elements for each cycle into a movement of the flow regulating member proper so as to make the net distance traversed by the flow regulating means proper for each cycle proportional to the algebraic sum of the separate distances traversed by the first and third movable elements for each cycle, and means working from and in connection with the first movable element so as to add at each cycle a small uniform positive or negative increment of movement to make the above described movement of the regulating means proper depending upon the positive or negative position respectively of the first movable element from its neutral position at the cycle under consideration.

4. In a regulator for fluid or power supply operating in a regular cyclical manner, flow regulating means proper, for this fluid or power supply, three variable elements, an indicating element uniformly actuated by the function dependent upon this fluid or power supply, means working from and in conjunction with the indicating element to vary at each cycle the first variable element an increment proportional to the increment of actuation of the indicating element for the previous cycle, means working from and in conjunction with the first variable element to vary at each cycle the second variable element an increment proportional to the increment of variation of the first variable element for each cycle, means for cancelling the increment of variation of the second variable element for each cycle at the conclusion of each cycle, means working from and in conjunction with the second variable element to vary the third variable element an increment necessary to make the value of the third variable element proportional to the value of the second variable element which the second variable element has at the conclusion of its variation for each cycle and before this variation is cancelled at the conclusion of the cycle, means combining and translating near the conclusion of each cycle the increment of variation of the first and increment of variation of the third elements for each cycle into variation of the fluid or power flow regulating means proper to make the net increment of variation of the flow regulating means proper for each cycle proportional to the algebraic sum of the separate increments of variation (with arbitrary constant coefficients) of the first and third variable element for each cycle.

5. In a regulator for fluid or power supply operating in a regular cyclical manner, flow regulating means proper, for this fluid or power supply, three variable elements, an indicating element uniformly actuated by the function dependent upon this fluid or power supply, means working from and in conjunction with the indicating element to vary at each cycle the first variable element an increment proportional to the increment of actuation of the indicating element for the previous cycle, means working from and in conjunction with the first variable element to vary at each cycle the second variable element an increment proportional to the increment of variation of the first variable element for each cycle, means for cancelling the increment of variation of the second variable element for each cycle at the conclusion of each cycle, means working from and in conjunction with the 120 second variable element to vary the third variable element an increment necessary to make the value of the third variable element proportional to the value of the second variable element which the second variable element has at the 125 conclusion of its variation for each cycle and before this variation is cancelled at the conclusion of the cycle, means combining and translating near the conclusion of each cycle the increment of variation of the first and increment of variation of the third variable elements for each cycle into variation of the fluid or power flow regulating means proper to make the net increment of variation of the flow regulating means proper for each cycle proportional to the algebraic sum 135 of the separate increments of variation (with arbitrary constant coefficients) of the first and third variable element for each cycle, and means working from and in conjunction with the first variable element so as to add at each cycle a small 140 positive or negative increment of movement to the above described movement of the regulating means proper depending upon the positive or negative position respectively of the indicating element from its neutral position at the cycle. 145

6. In a device of the kind described, a longitudinally movable bar having longitudinally spaced contact strips on one side of the bar, means to move said bar including a rotary element arranged to move the bar in one direction and the 150 other in accordance with the direction of rotation of the element, a pair of clutch elements rotating in opposite direction, clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and respectively with the contact strips, a reciprocable actuating member for said contact member arranged to move the contact member into engagement with said bar and to permit its movement from the bar, said actuating member moving into and out of engagement with the contact member, and means to reciprocate the actuating member in one direction and the other at spaced time intervals.

7. In a device of the kind described, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and respectively with the contact strips, a reciprocable actuating member for said contact member arranged to move the contact member into engagement with said bar and to permit its movement from the bar, said actuating member moving into and out of engagement with the contact member, coacting means on the contact member and actuating member holding the contact member from movement longitudinally of the bar upon engagement by the actuating member and means to reciprocate the actuating member in one direction and the other at spaced time intervals.

8. In a device of the kind described, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and respectively with the contact strips, a reciprocable actuating member for said contact member arranged to move the contact member into engagement with said bar and to permit its movement from the bar, said actuating member moving into and out of engagement with the contact member, coacting means on the contact member and actuating member holding the contact member from movement longitudinally of the bar upon engagement by the actuating member, and a cam having low and high segments engaging said actuating member to reciprocate the same, said cam having a constant speed of rotation.

9. In a device of the kind described, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and respectively with the contact strips, valve means controlling the function to be regulated, a reversible servo-motor for operating said valve means in one direction and another, a second pair of contact strips on said bar insulated from each other and from the first pair of contact strips, a pair of fixed contacts in the paths of the respective second strips at opposite ends of the bar and normally spaced therefrom, and circuit connections between said fixed contacts and servo-motor to cause the motor to run in one direction upon contact between one of the second strips and its fixed contact and in the opposite direction upon contact between the other second strip and its fixed contact.

10. In a device of the kind described, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and respectively with the contact strips, a reciprocable actuating member for said contact member arranged to move the contact member into engagement with said bar and to permit its movement from the bar, said actuating member moving into and out of engagement with the contact member, means to reciprocate the actuating member in one direction and the other at spaced time intervals, valve means controlling the function to be regulated, a reversible servo-motor for operating said valve means in one direction and another, a second pair of contact strips on said bar insulated from each other and from the first pair of contact strips, a pair of fixed contacts in the paths of the respective second strips at opposite ends of the bar and normally spaced therefrom, and circuit connections between said fixed contacts and servo-motor to cause the motor to run in one direction upon contact between one of the second strips and its fixed contact and in the opposite direction upon contact between the other second strip and its fixed contact.

11. In a device of the kind described, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and respectively with the contact strips, a reciprocable actuating member for said contact member arranged to move the contact member into engagement with said bar and to permit its movement from the bar, said actuating member moving into and out of engagement with the contact member, coacting means on the contact member and actuating member holding the contact member from movement longitudinally of the bar upon engagement by the actuating member, means to reciprocate the actuating member in one direction and the other at spaced time intervals, valve means controlling the function to be regulated, a reversible servo-motor for operating said valve means in one direction and another, a second pair of contact strips on said bar insulated from each other and from the first pair of contact strips, a pair of fixed contacts in the paths of the respective second strips at opposite ends of the bar and normally spaced therefrom, and circuit connections between said fixed contacts and servo-motor to cause the motor to run in one direction upon contact between one of the second strips and its fixed contact and in the opposite direction upon contact between the other second strip and its fixed contact.

12. In a device of the kind described, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and respectively with the contact strips, a reciprocable actuating member for said contact member arranged to move the contact member into engagement with said bar and to permit its movement from the bar, said actuating member moving into and out of engagement with the contact member, coacting means on the contact member and actuating member holding the contact member from movement longitudinally of the bar upon engagement by the actuating member, a cam having low and high segments engaging said actuating member to reciprocate the same, said cam having a constant speed of rotation, valve means controlling the function to be regulated, a reversible servo-motor for operating said valve means in one direction and another, a second pair of contact strips on said bar insulated from each other and from the first pair of contact strips, a pair of fixed contacts in the paths of the respective second strips at opposite ends of the bar and normally spaced therefrom, and circuit connections between said fixed contacts and servo-motor to cause the motor to run in one direction upon contact between one of the second strips and its fixed contact and in the opposite direction upon contact between the other second strip and its fixed contact.

13. In a device of the kind described, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, a clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having a circuit connection with said contact member and respectively with the contact strips, means to effect movement of the contact member into and out of engagement with the bar at regularly spaced time intervals, a second reciprocable bar having a pair of spaced contact strips thereon, electro-magnetic bar clutch means normally clutching the first and second bars together to cause the second bar to move in unison with the first bar, normally closed circuit connections for said bar clutch means, an interrupter for the last mentioned circuit connections operating in unison with the movement of the first contact member into and out of engagement with the first bar, a second movable contact member engaging the second bar and normally resting between the contact strips, actuating means for moving said second movable contact member longitudinally of the second bar and including a rotary element and clutch member carried thereby, a pair of clutch members rotating in opposite directions and selectively engageable by the last mentioned clutch member, electro-magnetic means for causing such selective engagement including circuit connections to the respective strips of the second bar, and means for interrupting the circuit through the last electro-magnetic means at intervals in unison with the movement of the first contact to and from the first bar.

14. In a device of the kind described, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite direction, clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and respectively with the contact strips, a reciprocable actuating member for said contact member arranged to move the contact member into engagement with said bar and to permit its movement from the bar, said actuating member moving into and out of engagement with the contact member, means to reciprocate the actuating member in one direction and the other at spaced time intervals, a second reciprocable bar having a pair of spaced contact strips thereon, electro-magnetic bar clutch means normally clutching the first and second bars together to cause the second bar to move in unison with the first bar, normally closed circuit connections for said bar clutch means, an interrupter for the last mentioned circuit connections operating in unison with the movement of the first contact member into and out of engagement with the first bar, a second movable contact member engaging the second bar and normally resting between the contact strips, actuating means for moving said second movable contact member longitudinally of the second bar and including a rotary element and clutch member carried thereby, a pair of clutch members rotating in opposite directions and selectively engageable by the last mentioned clutch member, electro-magnetic means for causing such selective engagement including circuit connections to the respective strips of the second bar and means for interrupting the circuit through the last electro-magnetic means at intervals in unison with the movement of the first contact to and from the first bar.

15. In a device of the kind described, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and respectively with the contact strips, a second pair of contact strips on said bar insulated from each other and from the first pair of contact strips, a pair of fixed contacts each engaging one of the second pair of contact strips, a second pair of fixed contacts in the paths of the respective second strips at opposite ends of the bar and normally spaced therefrom whereby movement of the pair causes connection between respective contacts of the first and second pair, a reciprocable actuating member for said contact member arranged to move the contact member into engagement with said bar and to permit its movement from the bar, said actuating member moving into and out of engagement with the contact member, coacting means on the contact member and actuating member holding the contact member from movement longitudinally of the bar upon engagement by the actuating member means to reciprocate the actuating member in one direction and the other at spaced time intervals, a second reciprocable bar having a pair of spaced contact strips thereon, electro-magnetic bar clutch means normally clutching the first and second bars together to cause the second bar to move in unison with the first bar, normally closed circuit connections for said bar clutch means, an interrupter from the last mentioned circuit connections operating in unison with the movement of the first contact member into and out of engagement with the first bar, means for returning the second bar into its original neutral position as soon as the last mentioned electro-magnetic clutch means are released, a second movable contact member engaging the second bar and normally resting between the contact strips, actuating means for moving said second movable contact member longitudinally of the second bar and including a rotary element and clutch member carried thereby, a pair of clutch members rotating in opposite directions and selectively engageable by the last mentioned clutch member, electro-magnetic means for causing such selective engagement including circuit connections to the respective strips of the second bar, and means for interrupting the circuit through the last electro-magnetic means at intervals in unison with the movement of the first contact to and from the first bar.

16. In a device of the kind described, valve means controlling the function to be regulated, a reversible servo-motor for operating said valve means in one direction and the other and having forward and reverse terminals, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, a clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and with the respective contact strips, and with the forward and reverse terminals respectively of the servo-motor, a reciprocable actuating member for said contact member arranged to move the contact member into engagement with said bar and to permit its movement from the bar, said actuating member moving into and out of engagement with the contact member, coacting means on the contact member and actuating member holding the contact member from movement longitudinally of the bar upon engagement by the actuating member, a cam having low and high segments engaging said actuating member to reciprocate the same, said cam having a constant speed of rotation, a second reciprocable bar having a pair of spaced contact strips thereon, electro-magnetic bar clutch means normally clutching the first and second bars together to cause the second bar to move in unison with the first bar, normally closed circuit connections for said bar clutch means, an interrupter for the last mentioned circuit connections operating in unison with the movement of the first contact member into and out of engagement with the first bar, a second movable contact member engaging the second bar and normally resting between the contact strips, actuating means for moving said second movable contact member longitudinally of the second bar and including a rotary element and clutch member carried thereby, a pair of clutch members rotating in opposite directions and selectively engageable by the last mentioned clutch member, electro-magnetic means for causing such selective engagement including circuit connections to the respective strips of the second bar, and means for interrupting the circuit through the last electro-magnetic means at intervals in unison with the movement of the first contact to and from the first bar.

17. In a device of the kind described, valve means controlling the function to be regulated, a reversible servo-motor for operating said valve means in one direction or the other and having forward and reverse terminals, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and with the respective contact strips, and with the forward and reverse terminals respectively of the servo-motor, a second pair of contact strips on said bar insulated from each other and from the first pair of contact strips, a pair of fixed contacts in the paths of the respective second strips at opposite ends of the bar and normally spaced therefrom, circuit connections between said fixed contacts and servo-motor to cause the motor to run in one direction upon contact between one of the second strips and its fixed contact and in the opposite direction upon contact between the other second strips and its fixed contact, an interrupter for last mentioned circuit limiting the duration of current in this circuit and operating in unison with the movement of the first contact member into and out of engagement with the first bar, a second reciprocable bar having a pair of spaced contact strips thereon, electro-magnetic bar clutch means normally clutching the first and second bars together to cause the second bar to move in unison with the first bar, normally closed circuit connections for said bar clutch means, an interrupter for the last mentioned circuit connections operating in unison with the movement of the first contact member into and out of engagement with the first bar, a second movable contact member engaging the second bar and normally resting between the contact strips, actuating means for moving said second movable contact member longitudinally of the second bar and including a rotary element and clutch member carried thereby, a pair of clutch members rotating in opposite directions and selectively engageable by the last mentioned clutch member, electro-magnetic means for causing such selective engagement including circuit connections to the respective strips of the second bar, and means for interrupting the circuit through the last electro-magnetic means at intervals in unison with the movement of the first contact to and from the first bar.

18. In a device of the kind described, valve means controlling the function to be regulated, a reversible servo-motor for operating said valve means in one direction and the other and having forward and reverse terminals, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, clutch means carried by the rotary elements and selectively engagable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and with the respective contact strips, and with the forward and reverse terminals of the servo-motor respectively, a reciprocable actuating member for said contact member arranged to move the contact member into engagement with said bar and to permit its movement from the bar, said actuating member moving into and out of engagement with the contact member, means to reciprocate the actuating member in one direction and the other at spaced time intervals, a second pair of contact strips on said bar insulated from each other and from the first pair of contact strips, a pair of fixed contacts in the paths of the respective second strips at opposite ends of the bar and normally spaced therefrom, circuit connections between said fixed contacts and servo-motor to cause the motor to run in one direction upon contact between one of the second strips and its fixed contact and in the opposite direction upon contact between the other second strips and its fixed contact, an interrupting means for said circuit limiting the duration of current in this circuit and operating in unison with the movement of the first contact member into and out of engagement with the first bar, a second reciprocable bar having a pair of spaced contact strips thereon, electromagnetic bar clutch means normally clutching the first and second bars together to cause the second bar to move in unison with the first bar, normally closed circuit connections for said bar clutch means, an interrupter for the last mentioned circuit connections operating in unison with the movement of the first contact member into and out of engagement with the first bar, means for returning the second bar into its original neutral position as soon as the last mentioned electro-magnetic clutch means are released, a second movable contact member engaging the second bar and normally resting between the contact strips, actuating means for moving said second movable contact member longitudinally of the second bar and including a rotary element and clutch member carried thereby, a pair of clutch members rotating in opposite directions and selectively engageable by the last mentioned clutch member, electro-magnetic means for causing such selective engagement including circuit connections to the respective strips of the second bar, and means for interrupting the circuit through the last electro-magnetic means at intervals in unison with the movement of the first contact to and from the first bar.

19. In a device of the kind described, valve means controlling the function to be regulated, a reversible servo-motor for operating said valve means in one direction and the other and having forward and reverse terminals, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and with the respective contact strips, and with the forward and reverse terminals of the servo-motor respectively, a reciprocable actuating member for said contact member arranged to move the contact member into engagement with said bar and to permit its movement from the bar, said actuating member moving into and out of engagement with the contact member, coacting means on the contact member and actuating member holding the contact member from movement longitudinally of the bar upon engagement by the actuating member, means to reciprocate the actuating member in one direction and the other at spaced time intervals, a second pair of contact strips on said bar insulated from each other and from the first pair of contact strips, a pair of fixed contacts in the paths of the respective second strips at opposite ends of the bar and normally spaced therefrom, circuit connections between said fixed contacts and servo-motor to cause the motor to run in one direction upon contact between one of the second strips and its fixed contact and in the opposite direction upon contact between the other second strip and its fixed contact, an interrupting means for said circuit limiting the time of current flow in this circuit and operating in unison with the movement of the first contact member into and out of engagement with the first bar, a second reciprocable bar having a pair of spaced contact strips thereon, electro-magnetic bar clutch means normally clutching the first and second bars together to cause the second bar to move in unison with the first bar, normally closed circuit connections for said bar clutch means, an interrupter for the last mentioned circuit connections operating in unison with the movement of the first contact member into and out of engagement with the first bar, means for returning the second bar into its original neutral position as soon as the last mentioned electro-magnetic clutch means are released, a second movable contact member engaging the second bar and normally resting between the contact strips, actuating means for moving said second movable contact member longitudinally of the second bar and including a rotary element and clutch member carried thereby, a pair of clutch members rotating in opposite directions and selectively engageable by the last mentioned clutch member, electro-magnetic means for causing such selective engagement including circuit connections to the respective strips of the second bar, and to the forward and reverse terminals of the servo-motor respectively, and means for interrupting the circuit through the last electromagnetic means at intervals in unison with the movement of the first contact to and from the first bar.

20. In a device of the kind described, valve means controlling the function to be regulated, a reversible servo-motor for operating said valve means in one direction and the other and having forward and reverse terminals, a longitudinally movable bar having longitudinally spaced contact strips on one side of the bar, means to move said bar including a rotary element arranged to move the bar in one direction and the other in accordance with the direction of rotation of the element, a pair of clutch elements rotating in opposite directions, clutch means carried by the rotary elements and selectively engageable with the elements of said pair, a movable contact member movable longitudinally of said bar in each direction from a neutral position between the contact strips, said movable contact member having the direction, extent and velocity of its movement along the bar controlled by the direction, extent and velocity of change in a function to be regulated, electro-magnetic means for causing selective engagement of the clutch means with the elements of the pair of clutch elements, said electro-magnetic means having circuit connection with said contact member and with the respective contact strips and with the forward and reverse terminals of the servo-motor respectively, a reciprocable actuating member for said contact member arranged to move the contact member into engagement with said bar and to permit its movement from the bar, said actuating member moving into and out of engagement with the contact member, co-acting means on the contact member and actuating member holding the contact member from movement longitudinally of the bar upon engagement by the actuating member, a cam having low and high segments engaging said actuating member to reciprocate the same, said cam having a constant speed of rotation, a second pair of contact strips on said bar insulated from each other and from the first pair of contact strips, a pair of fixed contacts in the paths of the respective second strips at opposite ends of the bar and normally spaced therefrom, circuit connections between said fixed contacts and servo-motor to cause the motor to run in one direction upon contact between one of the second strips and its fixed contact and in the opposite direction upon contact between the other second strip and its fixed contact, an interrupting means for said circuit limiting the time of current flow in this circuit and operating in unison with the movement of the first contact member into and out of engagement with the first bar, a second reciprocable bar having a pair of spaced contact strips thereon, electro-magnetic bar clutch means normally clutching the first and second bars together to cause the second bar to move in unison with the first bar, normally closed circuit connections for said clutch means, an interrupter for the last mentioned circuit connections operating in unison with the movement of the first contact member into and out of engagement with the first bar, means for returning the second bar into its original neutral position as soon as the last mentioned electro-magnetic clutch means are released, a second movable contact member engaging the second bar and normally resting between the contact strips, actuating means for moving said second movable contact member longitudinally of the second bar and including a rotary element and clutch member carried thereby, a pair of clutch members rotating in opposite directions and selectively engageable by the last mentioned clutch member, electro-magnetic means for causing such selective engagement including circuit connections to the respective strips of the second bar, and to the forward and reverse terminals of the servo-motor respectively, means for interrupting the circuit through the last electro-magnetic means at intervals in unison with the movement of the first contact to and from the first bar, and interrupter means in each circuit of the above mentioned contact strips preventing short circuits being effected between these circuits.

SERGEI D. MITEREFF.